United States Patent
Redert et al.

(10) Patent No.: US 8,132,927 B2
(45) Date of Patent: Mar. 13, 2012

(54) DISPLAY DEVICE WITH HOMOGENISING ATTENTUATING FILTER

(75) Inventors: Peter-Andre Redert, Eindhoven (NL); Siebe Tjerk De Zwart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 936 days.

(21) Appl. No.: 12/092,872

(22) PCT Filed: Oct. 30, 2006

(86) PCT No.: PCT/IB2006/054003
§ 371 (c)(1), (2), (4) Date: May 7, 2008

(87) PCT Pub. No.: WO2007/054851
PCT Pub. Date: May 18, 2007

(65) Prior Publication Data
US 2008/0316604 A1    Dec. 25, 2008

(30) Foreign Application Priority Data
Nov. 9, 2005 (EP) .................................. 05110527

(51) Int. Cl.
*G02B 27/00* (2006.01)

(52) U.S. Cl. ...................................................... 359/614

(58) Field of Classification Search .................. None
See application file for complete search history.

(56) References Cited

U.S. PATENT DOCUMENTS

| 4,706,173 A | * | 11/1987 | Hamada et al. ............... 362/341 |
| 6,049,424 A | | 4/2000 | Hamagishi |
| 2003/0002017 A1 | | 1/2003 | Segler et al. |
| 2005/0073472 A1 | | 4/2005 | Kim et al. |

FOREIGN PATENT DOCUMENTS

| DE | 3910520 A1 | * | 10/1990 |
| KR | 2003077357 A | | 10/2003 |
| WO | WO2004008226 A1 | | 1/2004 |
| WO | WO2004056103 A1 | | 7/2004 |

OTHER PUBLICATIONS

Van Berkel et al: "Multiview 3D-LCD"; Proceedings of the SPIE, vol. 2653, 1996, pp. 32-39.
Van Berkel et al: "Design and Applications of Multiview 3D-LCD" Proceedings of the 16th International Display Research Conference, Eurodisplay, Birmingham, Oct. 1-3, 1996, SID's International Dislay Research Conference, vol. Conf. 16, Oct. 1, 1996, pp. 109-112.
Okui et al: "Moire Fringe Reduction by Optical Filters in Integral Three-Dimensional Imaging on a Color Flat-Panel Display"; Applied Optics, OSA, Optical Society of American, vol. 44, No. 21, Jul. 20, 2005, pp. 4475-4483.

* cited by examiner

*Primary Examiner* — Lee Fineman
(74) *Attorney, Agent, or Firm* — Larry Liberchuk (57) ABSTRACT

A display device includes a display arrangement and an optical attenuator arrangement. The display arrangement has inherent non-uniformity of an output intensity across the display area. The optical attenuator arrangement is positioned in front of the display arrangement and in registration with the display area. The optical attenuator arrangement has a light attenuation characteristic that varies across the display area and is adapted to optically reduce the inherent non-uniformity of the output intensity.

12 Claims, 5 Drawing Sheets

DISPLAY DEVICE WITH HOMOGENISING ATTENUATING FILTER

This invention relates to display devices, and particularly to display devices which have inherent non-uniformities in an output intensity across the display area of a display device. More particularly, but not exclusively, the invention relates to the reduction of inherent moiré and moiré-like non-uniformities.

Moiré is a well known natural interference phenomenon that occurs when two periodic patterns are superimposed. A moiré pattern is typically observed across the display area of a display device as a series of waves and ripples. The moiré pattern detracts from the overall viewing experience of a user.

Moiré patterns are commonly observed in conventional cathode ray tube display devices. In such devices, a moiré pattern is caused by interference between a rectangular shadow mask pattern and a phosphorescence pattern. Such a moiré pattern is typically observed as a static pattern without any viewing angle dependence.

Moiré patterns are less commonly observed in conventional liquid crystal display devices, since each liquid crystal cell of these devices operates as one distinct pixel of a display area. However, non-uniformity patterns are sometimes observed due to non-uniformities in backlighting.

Moiré patterns, or other non uniformity patterns, can be more of a problem with certain three dimensional liquid crystal display devices known as autostereoscopic display devices.

An autostereoscopic display device is described in the paper entitled "Multiview 3D-LCD" by C. van Berkel et al. in SPIE Proceedings, Vol. 2653, 1996, pages 32-39. This device comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

In the autostereoscopic display device described above, the liquid crystal display panel is covered by an opaque patterned black mask, having black mask portions to prevent light from individual pixels from "leaking" in to surrounding areas. The mask is in the form of a rectangular grid, which covers the areas between the individual pixels.

The lens pattern and the pixel pattern are effectively superimposed, and moiré is caused by the spatial frequency ratio between these patterns. At certain distances, a moiré pattern will be observed.

The patterns are viewing angle dependent, and appear to move spatially as a user observing the display device moves from left to right. Effectively, the patterns have motion parallax, and may be equated to virtual non-uniformity patterns located at a fixed depth from the display plane of the display device.

There have been a number of proposals for reducing or eliminating the moiré-like patterns caused by the mask in autostereoscopic display devices. For example, thin film diode technology has been employed instead of the more conventional thin film transistor technology for the matrix display panel. Thin film diode technology allows for very narrow pixel boundaries, thereby minimising the moiré-like patterns.

It has also been proposed to provide the pixel columns at a relative acute angle to the lenticular elements, so that an equal amount of the mask is observable from all viewing angles. Another proposed solution is to employ an optical diffuser to minimise the effect of the moiré patterns.

All of the above approaches to moiré reduction in autostereoscopic display devices have drawbacks, which typically include a loss of depth and sharpness of the display output.

According to the invention, there is provided a display device comprising: a display arrangement having inherent non-uniformity of an output intensity across the display area; and an optical attenuator arrangement positioned in front of the display arrangement and in registration with the display area, wherein the optical attenuator arrangement has a light attenuation characteristic that varies across the display area and is adapted to optically reduce the inherent non-uniformity of the output intensity.

The optical attenuator arrangement is adapted to attenuate the output of the display arrangement in selected parts of the display area, the attenuation being complementary to that provided by the inherent non-uniformity of the display arrangement. In this way, a device may be provided having an overall output intensity that is inherently uniform.

For example, the display arrangement may have an inherent non-uniformity of the display output intensity that causes brightness to vary between levels of 100% and 99% across the display area. With the optical attenuation arrangement providing up to 1% attenuation, the overall brightness level of the display device is 99% across the entire display area.

Throughout this disclosure, the phrase "inherent non-uniformity" is intended to mean that the non-uniformity is entirely a function of the physical structure of the display arrangement. The phrase is not intended to relate to non-uniformity due to particular display data, or due to any interaction between the display data and the structure of the display arrangement.

The inherent non-uniformity of the display output intensity and the optical attenuation arrangement preferably each have a periodic characteristic, the periodic characteristic being in a direction across the display area. For example, the non-uniformity of the display output intensity may comprise a moiré pattern.

The optical attenuator arrangement preferably comprises a light attenuation panel. The light attenuation panel is preferably less than 10 mm thick, and more preferably less than 5 mm thick.

The non-uniformity of the display output intensity may be viewing angle independent. In this case, the light attenuation panel may be positioned directly adjacent the output of the display arrangement. Examples of this type of non-uniformity result from non-uniform backlighting of a liquid crystal display device and moiré interference between a rectangular shadow mask pattern and a phosphorescence pattern in a cathode ray tube display device.

The non-uniformity of the display output intensity may alternatively be viewing angle dependent, such that a virtual non-uniformity pattern has a position in front of the display plane, i.e. the pattern has motion parallax. In this case, the light attenuation panel may be spaced from the display plane at a position corresponding to the position of the virtual non-uniformity pattern. Another, particularly preferred, option is that the optical attenuator arrangement comprises a plurality of light attenuation panels together defining a virtual light attenuation pattern at a position corresponding to the position of the virtual non-uniformity pattern. Such an arrangement is particularly suitable where the virtual non-uniformity pattern has a position behind the display plane, and the arrangement may be integrated with the display arrangement to provide a compact display device.

Preferably, the plurality of light attenuation panels are positioned within 100 mm from the display plane.

Where the non-uniformity of the display output intensity is viewing angle dependent, first and second light attenuation panels may be provided having light attenuation characteristics that define substantially a cosine wave and a square wave respectively. Such an arrangement may be used to form a virtual light attenuation pattern positioned away from the display plane. The first light attenuation panel may be positioned against the display arrangement and the second light attenuation panel may be spaced from the first light attenuation panel.

In a particularly preferred embodiment, the first light attenuation panel has a light attenuation characteristic in a direction x defined by the following equation:

$$P_1(x) = 1 - \delta_{p1}\left(1 + \cos 2\pi \frac{x}{\lambda_{p1}}\right)$$

where $P_1(x)$ is the attenuation characteristic, $\delta_{p1}$ is an amplitude of the attenuation characteristic, and $\lambda_{p1}$ is a wavelength of the attenuation characteristic.

The second light attenuation panel has a light attenuation characteristic defined by a square wave having a duty cycle of $1-\delta_{p2}$ and a wavelength of $\lambda_{p2}$.

Each light attenuation panel may include a plurality of superimposed light attenuation patterns, for example two patterns, the light attenuation patterns together producing a moiré pattern for cancelling the non-uniformity of the display output.

The display arrangement may comprise a liquid crystal display panel having a row and column array of display elements. A wavelength of the light attenuation characteristic of the light attenuation arrangement is preferably less than the display element pitch, and preferably significantly less than the display element pitch. For example, the wavelength may be less than a tenth of the display element pitch. In this way, further moiré interference can be avoided.

The invention also provides an autostereoscopic display device comprising a display device as described above, wherein the display arrangement further comprises an array of lenses, each lens being associated with a plurality of display elements in each row of the array. The lenses may be lenticular lenses.

According to another aspect of the invention, there is provided a method of producing an observable image on a display device, the method comprising: providing a display arrangement having inherent non-uniformity of an output intensity across the display area; producing an observable image on the display area of the display arrangement; and optically reducing the inherent non-uniformity of the output intensity of the display arrangement by providing an optical attenuator arrangement positioned in front of the display arrangement and in registration with the display area, wherein the optical attenuator arrangement has a light attenuation characteristic that varies across the display area.

According to another aspect of the invention, there is provided an optical attenuator arrangement for reducing inherent non-uniformity of an output intensity of a display device, the arrangement being for positioning in front of the display arrangement and in registration with the display area, wherein the optical attenuator arrangement has a light attenuation characteristic that varies across the display area and is adapted to optically reduce the inherent non-uniformity of the output intensity.

Embodiments of the invention will now be described, purely by way of example, with reference to the accompanying drawings, in which.

The invention provides a display device having an optical attenuator arrangement positioned in front of and in registration with a display area. The optical attenuator arrangement has a light attenuation characteristic that varies across the display area and is adapted to optically cancel inherent non-uniformities in the display output intensity.

Figure 1:
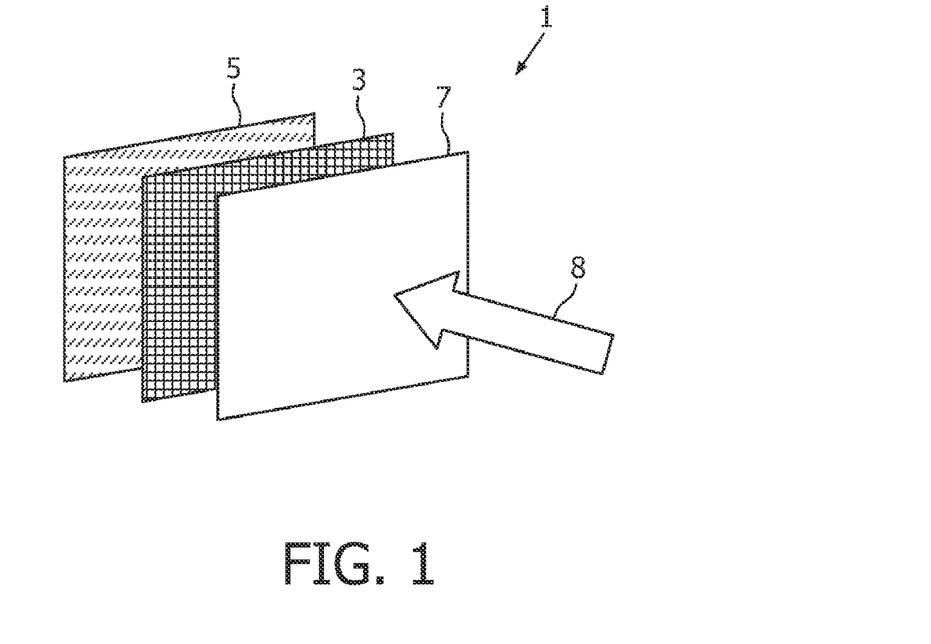
FIG. 1 is a schematic diagram of a first embodiment of the invention applied to a known two dimensional liquid crystal display device.

FIG. 1 is a schematic diagram of a first embodiment of the invention. The display device 1 comprises a known liquid crystal display device including a transmissive liquid crystal display panel 3 positioned in front of a backlight 5.

The liquid crystal display panel 3 is entirely conventional, and its structure will be known to those skilled in the art. The liquid crystal display panel 3 essentially comprises a row and column array of display pixels that are operable to selectively modulate light from the backlight 5 so as to form visible images over a display area that is defined by the array.

A problem associated with the arrangement described above is that it is it is difficult to provide a consistent level of backlighting across the entire display area. This is because the backlight 5 may for example comprises a point light source or a plurality of point light sources, and an arrangement for averaging the light output intensity. As a consequence, an image produced by the liquid crystal display panel 3 typically has non-uniformities in brightness across the display area, which non-uniformities are inherent in the structure of the arrangement. These non-uniformities are static, i.e. they do not depend on the particular data, or image, being displayed and they are not viewing angle dependent.

In order to remove the inherent non-uniformities due to inconsistent backlighting described above, the device 1 includes an optical attenuation panel 7 positioned against the display panel 3 in registration with the display area. The optical attenuation panel 7 comprises a substantially transparent sheet of glass. Although the sheet is substantially transparent to visible light, it caries a pattern of light attenuating material. The light attenuating material functions to cancel the inherent non-uniformity caused by the inconsistent backlighting described above.

The sheet is positioned with the optical attenuating material against the display panel 3 so that it is as close to the display plane as possible. In this way, parallax effects are minimised, so that the optical attenuating panel 7 is effective in cancelling the non-uniformities across a wide range of viewing angles. A typical viewing angle is indicated by arrow 8.

Figure 2A:
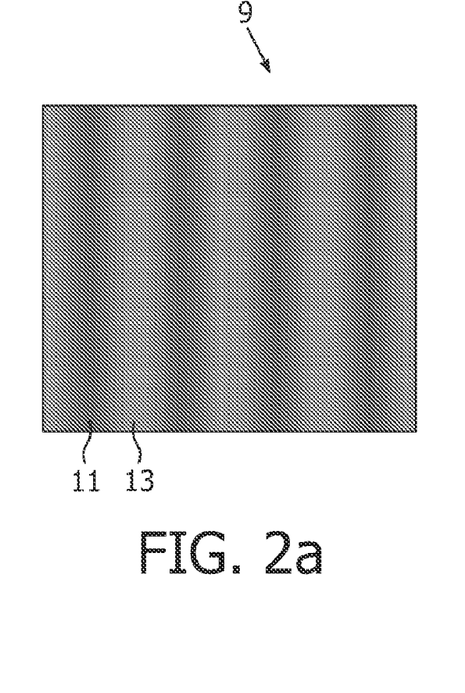
FIGS. 2a and 2b are used to describe use of the first embodiment shown in FIG. 1.
Figure 2B:
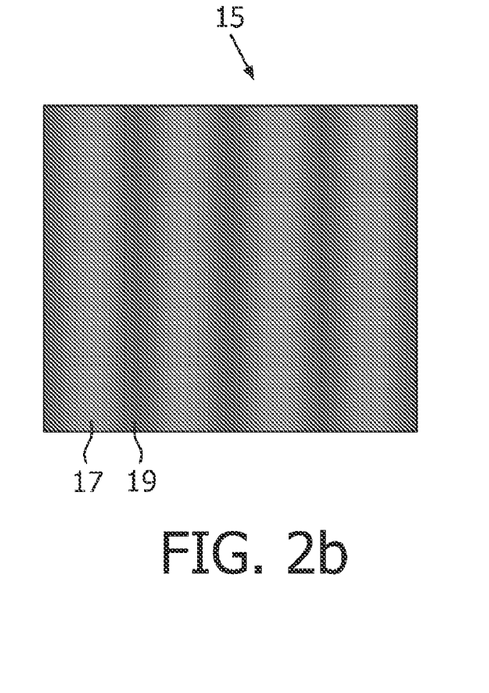

FIGS. 2a and 2b are used to describe use of the device shown in FIG. 1.

FIG. 2a illustrates the display output 9 when all pixels are set to display the same, lightest, grey level setting. As can be seen, the brightness of the display output varies across the display area due to inconsistent backlighting. More specifically, the display output 9 comprises alternate bands of 99% brightness 11 and 100% brightness 13.

FIG. 2b illustrates the optical attenuation characteristic 15 of the optical attenuation panel across the display area. As can be seen, the light attenuation provided by light attenuating material varies across the display area. More specifically, the attenuation characteristic 15 comprises alternate bands of 100% transmission (0% attenuation) 17 and 99% transmission (1% attenuation) 19.

In use, the display device 1, considered as a whole, has no inherent non-uniformity of brightness across the display area. This is the case for a wide range of viewing angles. The only other observable effect of the optical attenuation panel 7 is a very slight reduction in the overall brightness of the display output. There is no appreciable loss of depth or sharpness.

Figure 3:
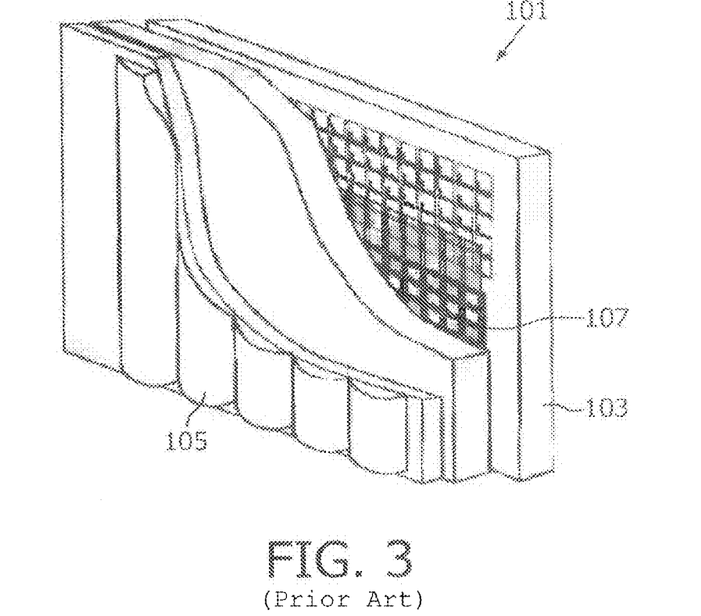
FIG. 3 is a cutaway diagram of a known autostereoscopic three dimensional liquid crystal display device.

FIG. 3 is a cutaway diagram of a known autostereoscopic three dimensional display device to which a second embodiment of the invention may be applied.

The device 101 comprises a conventional liquid crystal display panel 103, including a backlight. The liquid crystal display panel 103 is entirely conventional, and its structure will be known to those skilled in the art. The liquid crystal display panel 103 essentially comprises a row and column array of display pixels that are operable to selectively modulate light from the backlight, so as to form visible images over a display area that is defined by the array.

An array of elongate lenticular elements 105 extending parallel to one another overlies the display pixel array, and the display pixels are observed through these lenticular elements 105. The lenticular elements 105, which comprise elongate semi-cylindrical lens elements, extend parallel to the display pixel columns.

Between the display panel 103 and the array of lenticular elements 105, there is positioned a rectangular opaque black mask 107. The mask 107 covers the areas between the pixels of the display panel 103, without covering the pixels themselves. The purpose of the mask 107 is to separate the pixels of the display panel, and to prevent any light from leaking from unmodulated areas of liquid crystal between the pixels.

Each lenticular element 105 in this example overlies four columns of display pixels and, in use, the display pixels in each column provide a vertical slice of a respective two dimensional sub-image. The lenticular sheet 105 directs the four slices and corresponding slices from the display pixel columns associated with the other lenticules, to respective viewing areas of the display device 101. Two of the four sets of slices are directed to the left and right eyes respectively of a user positioned in front of the device 101, so that the user observes a single stereoscopic image. As the user's head is moved from left to right, a series of successive, different, stereoscopic views are observed.

A problem associated with the above described device 101 is that the lenticular elements 105 project an image of the mask 107 as well as the slices of pixels making up the sub-images. The mask 107 is observable as an inherent non-uniformity of the output intensity of the display device 101, and takes the form of a moiré-like pattern of vertical lines. The pattern appears to move spatially as the user moves from left to right, i.e. the pattern has motion parallax. This moiré-like pattern is in fact equivalent to a static, virtual non-uniformity pattern located at a fixed depth from the display plane of the device 101.

Figure 4A:
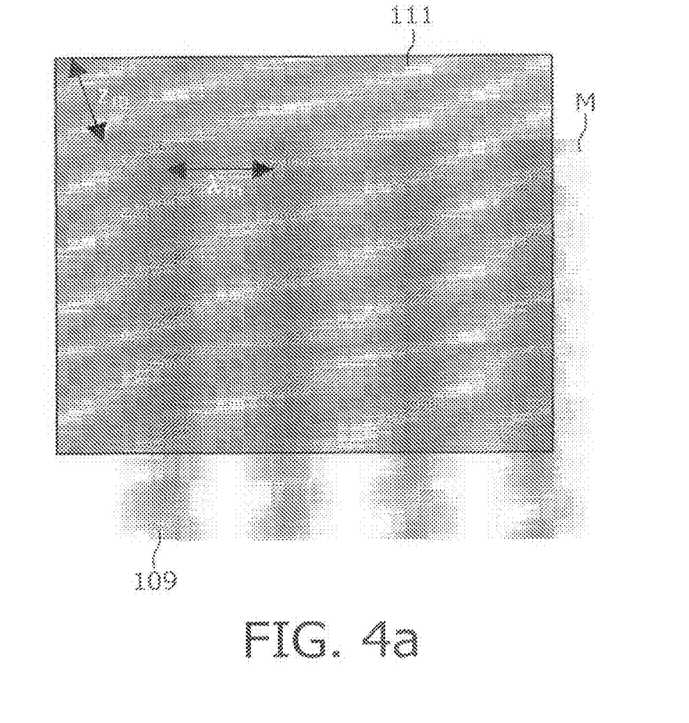
FIGS. 4a and 4b are used to describe a non-uniformity of output intensity associated with the device shown in FIG. 3.
Figure 4B:
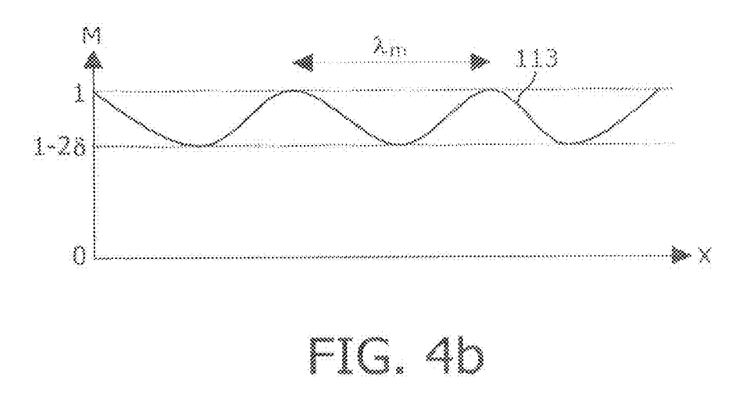

FIGS. 4a and 4b illustrate the virtual non-uniformity pattern caused by the mask 107. As shown in FIG. 4a, the virtual non-uniformity pattern 109 is located at a depth $z_m$ relative to the display plane 111, and has wavelength $\lambda_m$, and intensity $\delta_m$. The brightness characteristic 113 of the virtual non-uniformity pattern, as shown in FIG. 4b, approximates a cosine function in a direction x and is defined by equation 1:

$$M(x) = 1 - \delta_m\left(1 + \cos 2\pi \frac{x}{\lambda_m}\right) \quad (1)$$

For the device 101 shown in FIG. 3, the virtual non-uniformity pattern depth $z_m$ is equal to the designed viewing distance, which may for example be 1 metre. The wavelength $\lambda_m$ of the brightness characteristic is for example 5 centimetres and the intensity of the brightness characteristic $\delta_m$ is 1%.

Figure 5:
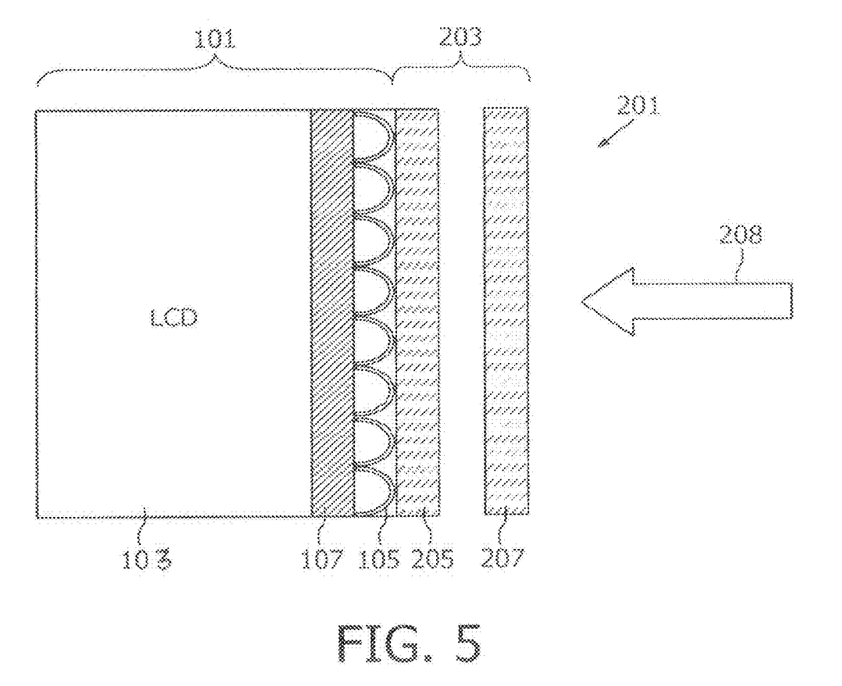
FIG. 5 is a schematic diagram of a second embodiment of the invention applied to the known device shown in FIG. 3.

FIG. 5 is a schematic diagram of a second embodiment of the invention. The second embodiment is a display device 201 comprising the display device 101 described with reference to FIG. 3.

As described above, the display device 101 comprises a liquid crystal display panel 103, an array of lenticular elements 105 and a mask 107 positioned there between.

The display device 201 of the second embodiment also includes an optical attenuation arrangement 203 for cancelling out the effect of the virtual non-uniformity pattern 109 caused by the mask 107, described above with reference to FIGS. 4a and 4b.

A typical viewing direction for the display device 201 is indicated by arrow 208.

The optical attenuation arrangement 203 comprises first and second optical attenuation panels 205, 207. Each panel 205, 207 comprises a substantially transparent sheet, for example glass. Although the sheets are substantially transparent to visible light, they carry a pattern of light attenuating material.

The optical attenuation panels 205, 207 together define a virtual light attenuation pattern at a depth from the display plane 111 equal to the depth of the virtual non-uniformity pattern 109 caused by the mask 107.

Figure 6A:
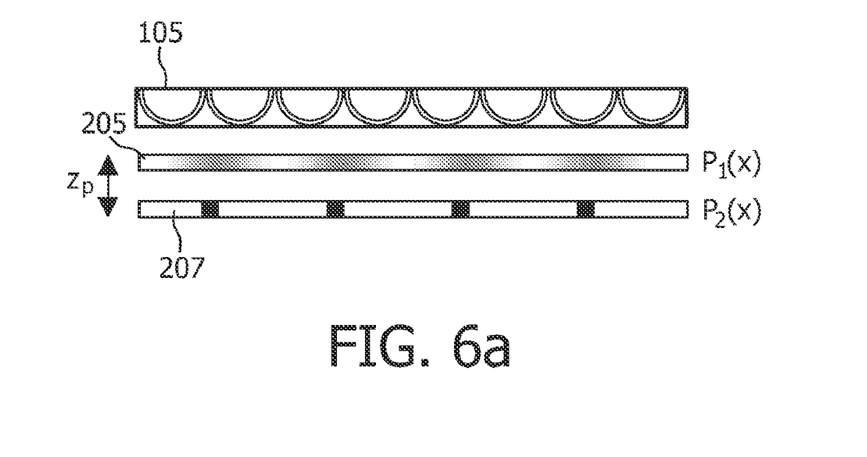
FIGS. 6a, 6b and 6c are used to describe the second embodiment shown in FIG. 5.
Figure 6B:
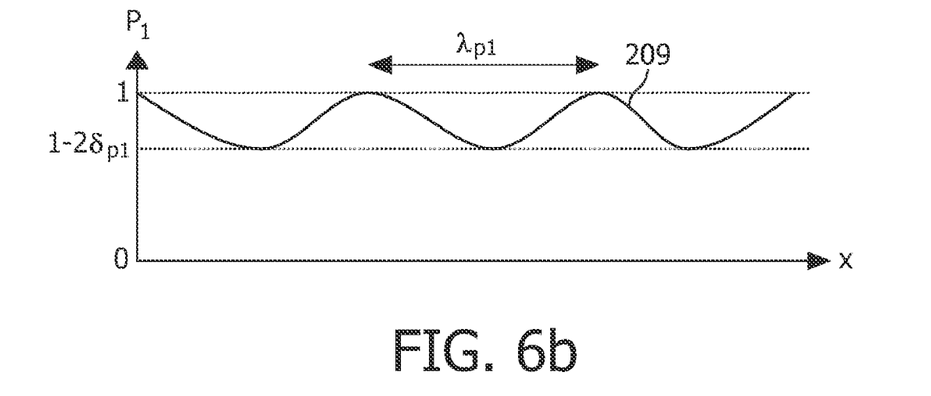
Figure 6C:
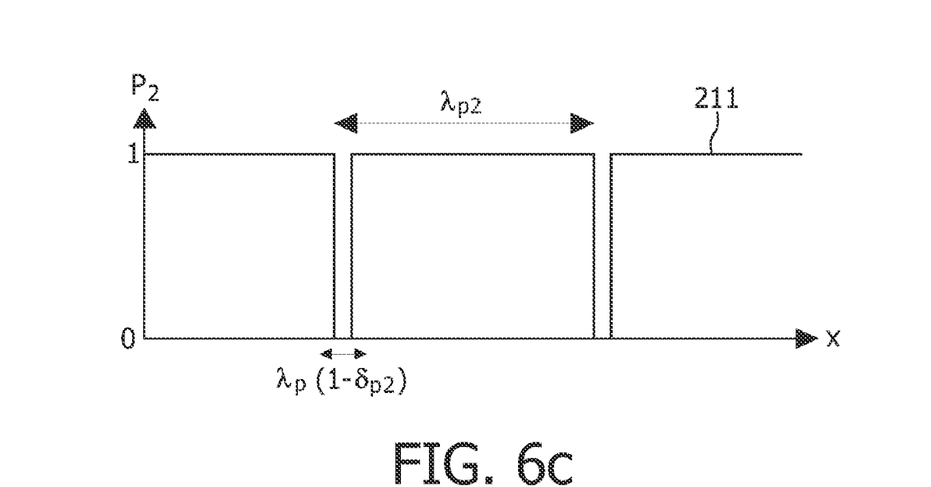

FIGS. 6a, 6b and 6c schematically illustrate the optical attenuating panels 205, 207 in more detail. The first panel 205 is positioned against the array of lenticular elements 105, and the second panel 207 is spaced a small distance $z_p$ from the first panel 205. The first and second panels 205, 207 have respective light attenuation characteristics $P_1$, $P_2$ which are periodic in the direction x perpendicular to the length of the lens elements.

The light attenuation characteristics 209, 211 of the first and second panels 205, 207 are shown in FIGS. 6b and 6c respectively, and are defined as follows:

$$P_1(x) = 1 - \delta_{p1}\left(1 + \cos 2\pi \frac{x}{\lambda_{p1}}\right) \quad (2)$$

$$P_2(x) = \text{square wave with duty cycle of } 1 - \delta_{p2} \text{ and wavelength } \lambda_{p2} \quad (3)$$

where $\delta_{p1}$ and $\lambda_{p1}$ are the amplitude and wavelength of the attenuation characteristic of the first panel 205. The values of $\delta_{p1}$, $\lambda p1$, $\delta_{p2}$, $\lambda_{p2}$ as well as the spacing $z_p$ are the design parameters for the attenuation device.

Ignoring fine detail below the display's pixel resolution, i.e. at the resolutions of $\lambda_{p1}$, $\lambda_{p2}$, it can be shown that the light attenuation characteristic AM(x) of the virtual light attenuation pattern, in the direction x, is approximated by the following equation:

$$AM(x) \approx T + \delta_{am}\left(1 + \cos 2\pi \frac{x}{\lambda_{am}}\right) \quad (4)$$

where:

$$z_{am} = z_p \frac{\lambda_{p1}}{\lambda_{p1} - \lambda_{p2}} \quad (5)$$

$$\lambda_{am} = \frac{\lambda_{p1}\lambda_{p2}}{|\lambda_{p1} - \lambda_{p2}|}$$

$$T = 1 - \delta_{p1} - \delta_{p2}$$

$$\delta_{am} = \delta_{p1}\delta_{p2}$$

and where $z_{am}$ is the depth of the virtual light attenuating pattern as measured from the second attenuation panel 207, and $\lambda_{am}$ and $\delta_{am}$ are the wavelength and the amplitude of the virtual light attenuating pattern respectively. The value $z_p$ is the physical separation of the two panels. The term T is the base attenuation onto which the periodic fluctuation in intensity is superimposed.

In order that the virtual non-uniformity pattern 109 is cancelled by the virtual light attenuation pattern, the following relationships are fixed:

$$z_{am} = z_m$$

(so that the depth of the attenuation pattern provided by the attenuator is matched with the depth of the inherent non-uniformity pattern)

$$\lambda_{am} = \lambda_m$$

$$\delta_{am} = \delta_m,$$

$$\lambda_{p1} = \frac{1}{(1-\alpha)}\lambda_p$$

$$\lambda_{p2} = \lambda_p$$

(so that the characteristics of the attenuation pattern provided by the attenuator are matched with the inherent non-uniformity pattern); and $$\delta_{p1} = \delta_{p2} = \delta_p,$$

(for ease of design)

Using the above relationships, the following can be derived:

$$\delta_p = \sqrt{\delta_m}$$

$$T = 1 - 2\sqrt{\delta_m}$$

$$z_p = \alpha z_m$$

$$\lambda_p = \alpha \lambda_m \quad (6)$$

The design variable α enables the physical separation $z_p$ to be scaled to any value, and may be sufficiently small to ensure that the optical attenuator arrangement 203 can be accommodated in a minimal amount of space in front of the display device 101.

For the values of $z_m$, $\lambda_m$ and $\delta_m$ of the display device shown in FIG. 3, $\delta_p$ is 0.1 and T=0.8, i.e. a 20% brightness loss.

Selecting $\alpha = 5 \times 10^{-3}$, provides a value for $z_p$ of 5 mm, a value for $\lambda_{p1}$ of 0.2513 mm and a value for $\lambda_{p2}$ of 0.25 mm. The latter values are smaller than the output resolution of the display device (which is determined by the lens width/pitch), thereby ensuring that additional moiré interference is not introduced.

Figure 7:
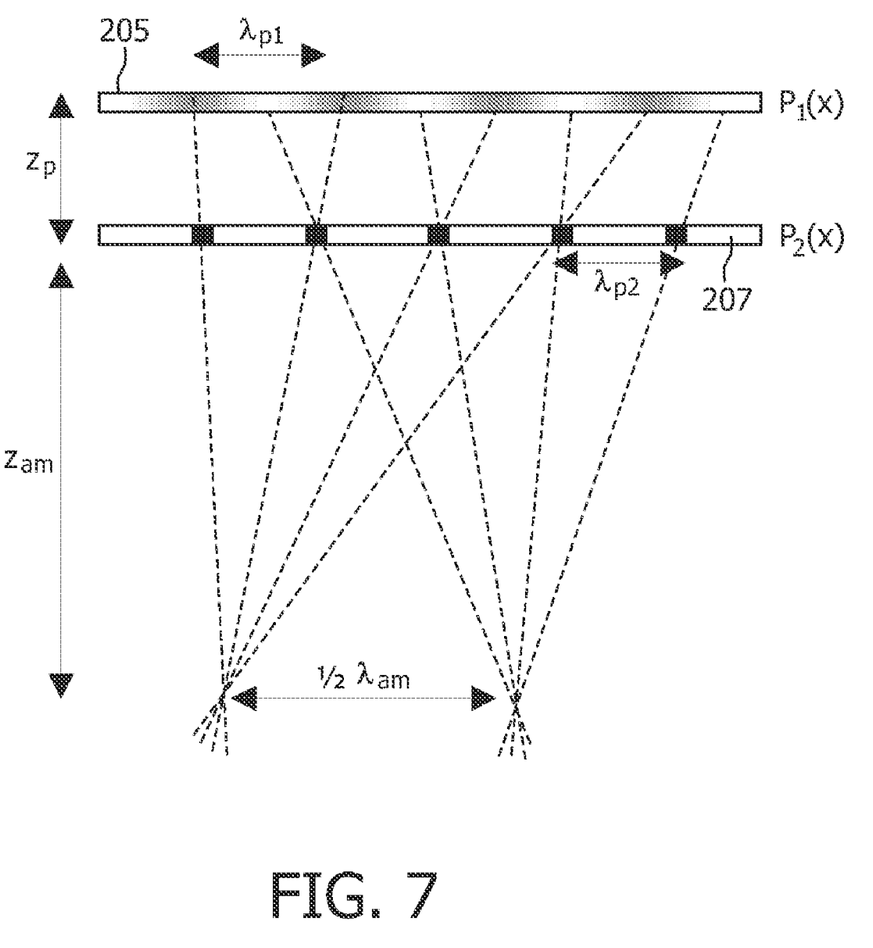
FIG. 7 is used to describe use of the second embodiment shown in FIG. 5.

FIG. 7 is used to describe use of the second embodiment shown in FIG. 5.

In FIG. 7, the left focus point has the attenuating parts of the panel 207 aligned with the attenuating parts of the panel 205. The right focus point has the attenuating parts of the panel 207 aligned with the non-attenuating parts of the panel 205, and the means there is a greater reduction in brightness. Thus, the two panels 205,207 project a varying brightness pattern, which may be considered to be a virtual light attenuation pattern, into the plane at the distance $z_{am}$.

In use, the attenuating and non-attenuating regions of the virtual attenuation pattern cancel the effects of the virtual non-uniformity pattern 109. In this way, a display device 201 is provided having no inherent non-uniformities caused by a mask 107.

Two specific embodiments of the invention have been described. However, it will be apparent to those skilled in the art that various changes and modifications may be made to these embodiments, without departing from the scope of the invention. For example, the virtual light attenuation pattern may be provided by various alternative optical arrangements. Different attenuation patterns may also be provided for the cancellation of different types of non-uniformity.

Also, although the embodiments of the invention have been described in the context of a complete display device, alternative embodiments could take the form of a standalone optical attenuation arrangement for use with existing display devices. In this case, a frame may additionally be provided for aligning the optical attenuation arrangement with the display area of the display device.

The attenuator arrangement has been described as reducing the non-uniformity. Clearly, the design will aim to cancel these non-uniformities, and this may be possible depending on the nature of the display panel inherent characteristics.

The panels can be formed as a slide on which the desired pattern is printed, using an accurate high resolution printer, for example laser printing onto slides. Additional fully transparent slides can be used to set the spacing between the panels. The different materials used should have the same expansion coefficients.

The attenuation panel is preferably attached during manufacture, but this may be carried out by hand so that the attenuation panel may be installed as an additional product.

Various other modifications will be apparent to those skilled in the art.

The invention claimed is:

1. A display device comprising:
a display arrangement having inherent non-uniformity of an output intensity across the display area; and
an optical attenuator arrangement comprising a light attenuation panel positioned in front of the display arrangement and in registration with the display area,
wherein the optical attenuator arrangement has a light attenuation characteristic that varies across the display area and is adapted to optically reduce the inherent non-uniformity of the output intensity,
wherein the non-uniformity of the display output intensity is viewing angle dependent, such that a virtual non-uniformity pattern has a position in front of the display plane, and wherein the light attenuation panel is spaced from the display plane at a position corresponding to the position of the virtual non-uniformity pattern.

2. A display device comprising:
a display arrangement having inherent non-uniformity of an output intensity across the display area; and
an optical attenuator arrangement positioned in front of the display arrangement and in registration with the display area,
wherein the optical attenuator arrangement has a light attenuation characteristic that varies across the display area and is adapted to optically reduce the inherent non-uniformity of the output intensity,
wherein the non-uniformity of the display output intensity is viewing angle dependent, such that a virtual non-uniformity pattern has a position in front of or behind the display plane, and wherein the optical attenuator arrangement comprises a plurality of light attenuation panels together defining a virtual light attenuation pattern at a position corresponding to the position of the virtual non-uniformity pattern.

3. A display device according to claim 2, wherein the inherent non-uniformity of the display output intensity and the optical attenuation arrangement each have a periodic characteristic.

4. A display device according to claim 2, wherein the non-uniformity of the display output intensity comprises a moiré pattern.

5. A display device according to claim 2, wherein the plurality of light attenuation panels are positioned within 100 mm from the display plane.

6. A display device according to claim 2, comprising first and second light attenuation panels having characteristics that define substantially a sine wave and a square wave respectively.

7. A display device according to claim 6, wherein one of the first and second light attenuation panels is positioned against the display arrangement and the other of the first and second light attenuation panels is spaced from the first light attenuation panel.

8. A display device according to claim 6, wherein the first light attenuation panel has a characteristic defined by the following equation:

$$P_1(x) = 1 - \delta_{p1}\left(1 + \cos 2\pi \frac{x}{\lambda_{p1}}\right)$$

where $P_1(x)$ is the attenuation characteristic, $\delta_{p1}$ is an amplitude of the attenuation characteristic, and $\lambda_{p1}$ is a wavelength of the attenuation characteristic.

9. A display device according to claim 6, wherein the second light attenuation panel has a characteristic defined by a square wave having a duty cycle of $1-\delta_{p2}$ and a wavelength of $\lambda_{p2}$, where $\delta_{p2}$ is an amplitude of the attenuation characteristic.

10. A display device according to claim 2, wherein the display arrangement comprises a liquid crystal display panel having a row and column array of display elements.

11. A display device according to claim 10, wherein a wavelength of the light attenuation characteristic of the light attenuation arrangement is less than a display element pitch.

12. A display device according to claim 10, wherein the display arrangement further comprises an array of lenses, each lens being associated with a plurality of display elements in each row of the array.

\* \* \* \* \*